(12) United States Patent
Kim

(10) Patent No.: US 9,874,265 B2
(45) Date of Patent: Jan. 23, 2018

(54) ROTARY TABLE DEVICE HAVING MULTI-WORM SHAFT

(71) Applicant: Sung-Gon Kim, Ulsan (KR)

(72) Inventor: Sung-Gon Kim, Ulsan (KR)

( * ) Notice: Subject to any disclaimer, the term of this patent is extended or adjusted under 35 U.S.C. 154(b) by 283 days.

(21) Appl. No.: 14/647,096

(22) PCT Filed: Dec. 2, 2013

(86) PCT No.: PCT/KR2013/011066
§ 371 (c)(1),
(2) Date: May 25, 2015

(87) PCT Pub. No.: WO2014/098388
PCT Pub. Date: Jun. 26, 2014

(65) Prior Publication Data
US 2015/0276019 A1  Oct. 1, 2015

(30) Foreign Application Priority Data

Dec. 18, 2012  (KR) .......................... 10-2012-0148538

(51) Int. Cl.
| | | |
|---|---|---|
| *F16H 37/06* | (2006.01) | |
| *H02K 7/116* | (2006.01) | |
| *F16H 1/16* | (2006.01) | |
| *F16H 1/22* | (2006.01) | |
| *B23Q 5/56* | (2006.01) | |
| *B23Q 16/02* | (2006.01) | |

(Continued)

(52) U.S. Cl.
CPC .................. *F16H 1/22* (2013.01); *B23Q 5/56* (2013.01); *B23Q 16/025* (2013.01); *F16H 37/041* (2013.01); *F16H 57/12* (2013.01); *F16H 1/225* (2013.01); *F16H 7/023* (2013.01); *F16H 7/18* (2013.01); *Y10T 74/19019* (2015.01)

(58) Field of Classification Search
CPC ........................................................ F16H 1/16
USPC ........................... 74/664, 665 H, 421 A, 425
See application file for complete search history.

(56) References Cited

U.S. PATENT DOCUMENTS

| | | | | |
|---|---|---|---|---|
| 6,666,109 | B2 * | 12/2003 | Kitagawa ............. | B23Q 16/025 29/35.5 |
| 7,192,018 | B2 * | 3/2007 | Omori .................. | B23Q 1/0009 269/131 |
| 2005/0212193 | A1 * | 9/2005 | Omori .................. | B23Q 1/0009 269/71 |

FOREIGN PATENT DOCUMENTS

| | | |
|---|---|---|
| JP | 01-307555 | 12/1989 |
| JP | 06-249295 | 9/1994 |

(Continued)

OTHER PUBLICATIONS

International Search Report dated Feb. 17, 2014 From the Korean Intellectual Property Office Re. Application No. PCT/KR2013/011066 and Its Translation Into English.

*Primary Examiner* — Ha D Ho

(57) ABSTRACT

A rotary table device is provided, which includes a housing having a space portion formed therein, a main shaft installed in the space portion and provided with a worm wheel coupled along an outer circumference thereof, a pair of worm shafts provided to be engaged with the worm wheel at both sides of the worm wheel in a predetermined position of the space portion, a driving motor installed on one side of the housing, a power transmission member installed on an upper surface of the housing to transmit a driving force of the driving motor to the pair of worm shafts, and a clearance adjustment member installed in a predetermined position of each lower end of both sides of the housing.

4 Claims, 4 Drawing Sheets

(51) Int. Cl.
      *F16H 57/12*     (2006.01)
      *F16H 37/04*     (2006.01)
      *F16H 7/02*     (2006.01)
      *F16H 7/18*     (2006.01)

(56) References Cited

FOREIGN PATENT DOCUMENTS

| | | |
|---|---|---|
| JP | 2009-095954 | 5/2009 |
| KR | 10-2002-0029969 | 4/2002 |
| KR | 10-2020-0025388 | 3/2010 |
| KR | 10-2011-0049045 | 5/2011 |
| WO | WO 2014/098388 | 6/2014 |

\* cited by examiner

ROTARY TABLE DEVICE HAVING MULTI-WORM SHAFT

RELATED APPLICATIONS

This application is a National Phase of PCT Patent Application No. PCT/KR2013/011066 having International filing date of Dec. 2, 2013, which claims the benefit of priority of Korean Patent Application No. 10-2012-0148538 filed on Dec. 18, 2012. The contents of the above applications are all incorporated by reference as if fully set forth herein in their entirety.

TECHNICAL FIELD

The present disclosure relates to a rotary table device having a multi-worm shaft, and more particularly, to a rotary table device having a multi-worm shaft, which can minimize backlash that occurs due to wear between a worm wheel and a worm shaft.

BACKGROUND ART

In general, a rotary table device is installed in various kinds of machine tools and processes a workpiece through rotational division of the workpiece at a predetermined angle.

The rotary table device includes a housing to which a driving motor is coupled, and a main shaft and a worm shaft coupled to an outer circumference of a worm wheel provided in a space portion formed in the housing.

In the rotary table device, the worm shaft and the worm wheel are tooth-engaged with each other, and the worm wheel divides a rotating angle finely and precisely through rotation of the worm shaft.

However, the worm shaft and the worm wheel of the rotary table device in the related art have the problems that uneven wear occurs when in use, and an error occurs in a gap between the worm shaft and the worm wheel to greatly deteriorate the efficiency of the rotary table device.

Further, the worm shaft and the worm wheel of the rotary table device also have the problems that it is difficult to easily grasp the engagement state between the worm shaft and the worm wheel due to a long-term use and to finely adjust the gap in accordance with the engagement state.

SUMMARY OF THE INVENTION

Technical Problem

Accordingly, the present disclosure has been made to solve the aforementioned problems occurring in the prior art, and it is an object of the present disclosure to provide a rotary table device having a multi-worm shaft, which can adjust a gap between a worm wheel and a worm shaft so as to prevent uneven wear which occurs due to backlash that occurs between the worm wheel and the worm shaft.

Technical Solution

To achieve the above objects, according to one aspect of the present disclosure, there is provided a rotary table device, which includes a housing having a space portion formed therein; a main shaft installed in the space portion and provided with a worm wheel coupled along an outer circumference thereof; a pair of worm shafts provided to be engaged with the worm wheel at both sides of the worm wheel in a predetermined position of the space portion; a driving motor installed on one side of the housing; a power transmission member installed on an upper surface of the housing to transmit a driving force of the driving motor to the pair of worm shafts; and a clearance adjustment member installed in a predetermined position of each lower end of both sides of the housing.

The power transmission member may include a pair of belt pulleys provided on the upper surface of the housing and coupled to each end portion of the pair of worm shafts; a pair of idle gears provided in a predetermined position of the upper surface of the housing so as to be positioned between the pair of belt pulleys; and a belt connecting the pair of belt pulleys and the pair of idle gears to a driving shaft of the driving motor.

The pair of belt pulleys and the pair of idle gears are connected to each other through the driving shaft of the driving motor and a chain.

At least one of the pair of idle gears may be provided on the upper surface of the housing so as to adjust a tension of the belt that connects the driving shaft of the driving motor and the pair of belt pulleys to each other, and be slidably coupled to a plate having a slot formed in a center portion thereof.

The clearance adjustment member may include a pair of coupling portions symmetrically coupled to predetermined positions of the both sides of the housing; and adjustment portions screw-engaged to penetrate centers of the coupling portions, wherein the adjustment portions adjust a gap between the worm wheel and the worm shaft through pressing of outer sides of the pair of worm shafts.

Advantageous Effect

According to the rotary table device having the multi-worm shaft according to an embodiment of the present disclosure, the gap between the worm wheel and the worm shaft can be adjusted so as to prevent the uneven wear which occurs due to the backlash that occurs between the worm wheel and the worm shaft.

EXPLANATION OF REFERENCE NUMERALS FOR MAIN PARTS IN THE DRAWING

Figure 1:
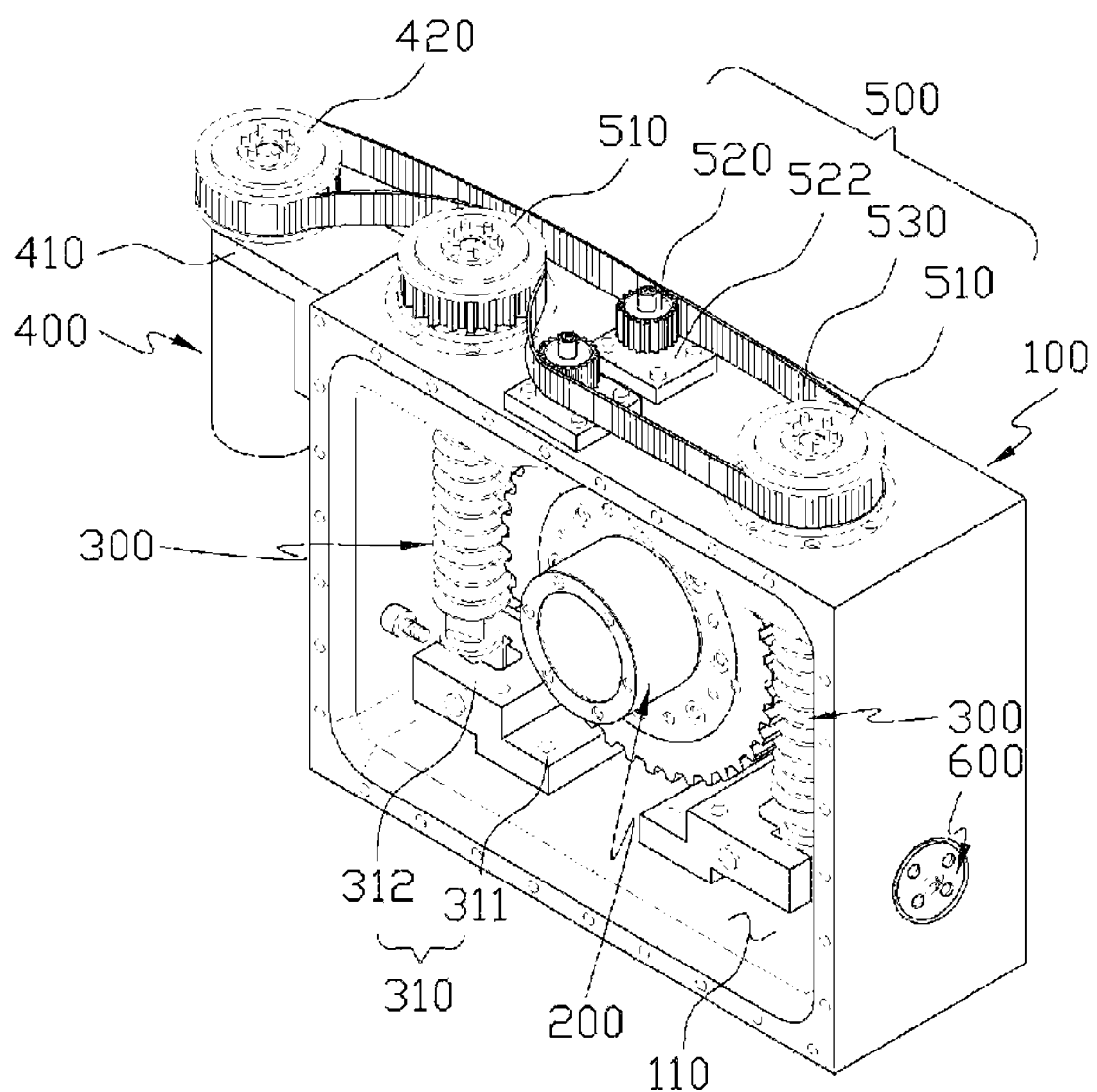
FIG. 1 is a perspective view of a rotary table device having a multi-worm shaft according to an embodiment of the present disclosure.

10: rotary table device
100: housing

110: space portion
200: main shaft
210: worm wheel
220: cover
300: a pair of worm shafts
310: worm shaft holder
311: first horizontal portion
312: second horizontal portion
313: cut portion
400: driving motor
410: fixing bracket
420: driving shaft
500: power transmission member
510: a pair of belt pulleys
520: a pair of idle gears
521: slot hole
522: plate
530: belt
531: chain
532: sprocket
600: clearance adjustment member
610: coupling portion
612: adjustment portion

DESCRIPTION OF SPECIFIC EMBODIMENTS OF THE INVENTION

Hereinafter, preferred embodiments of the present disclosure will be described in detail with reference to the accompanying drawings. In describing the present disclosure, the thickness of lines or the size of constituent elements illustrated in the drawings may be exaggerated for clarity and convenience in explanation.

Further, all terms used in the description are terms that are defined in consideration of their functions in the present disclosure, and may differ depending on intentions of a user or an operator or customs. Accordingly, they should be defined on the basis of the contents of the whole description of the present disclosure.

Figure 2:
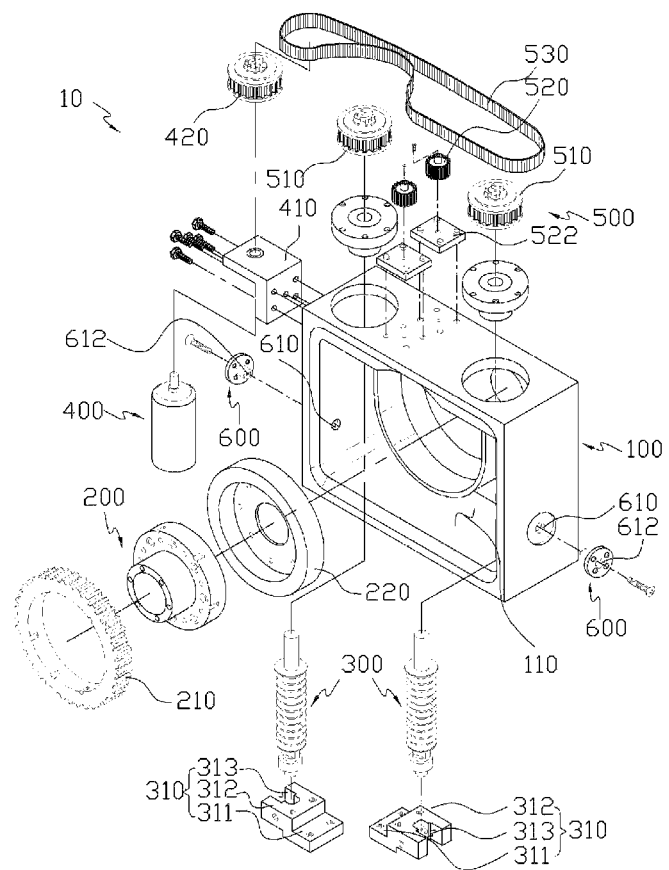
FIG. 2 is an exploded perspective view of a rotary table device having a multi-worm shaft according to an embodiment of the present disclosure.
Figure 3:
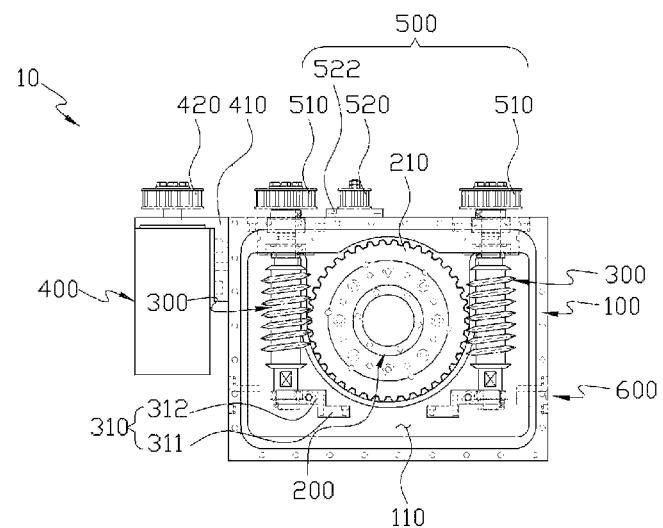
FIG. 3 is a front view of a rotary table device having a multi-worm shaft according to an embodiment of the present disclosure.
Figure 4:
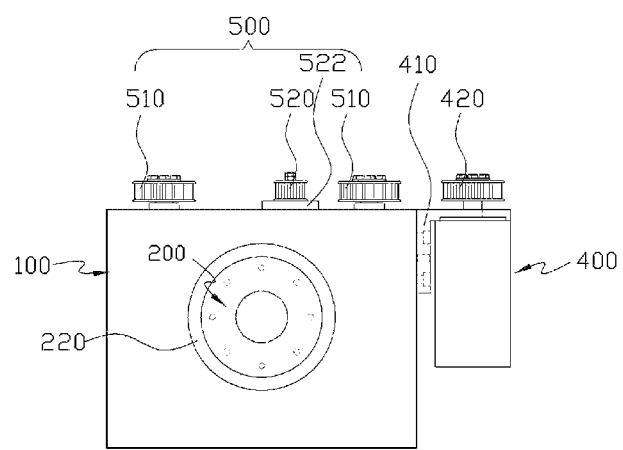
FIG. 4 is a rear view of a rotary table device having a multi-worm shaft according to an embodiment of the present disclosure.
Figure 5:
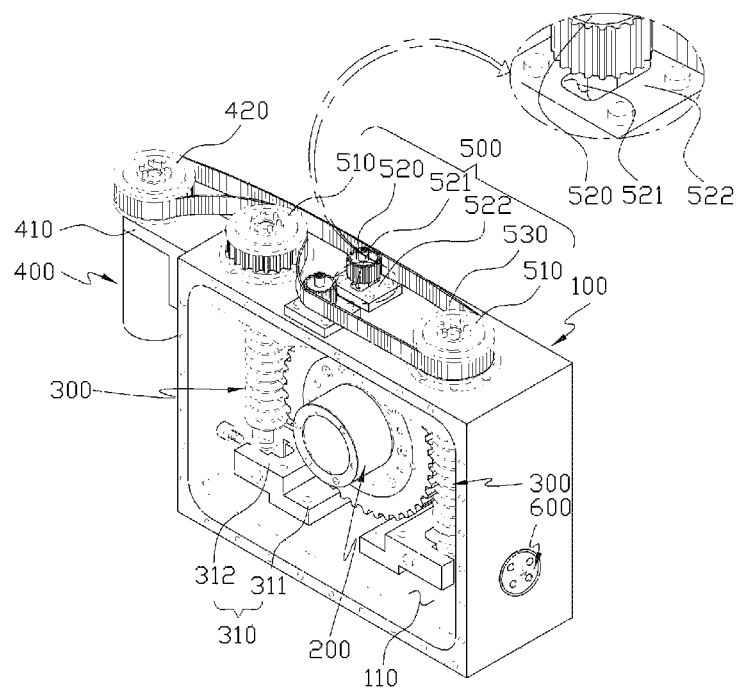
FIG. 5 is a perspective view of a rotary table device having a slide portion according to an embodiment of the present disclosure.
Figure 6:
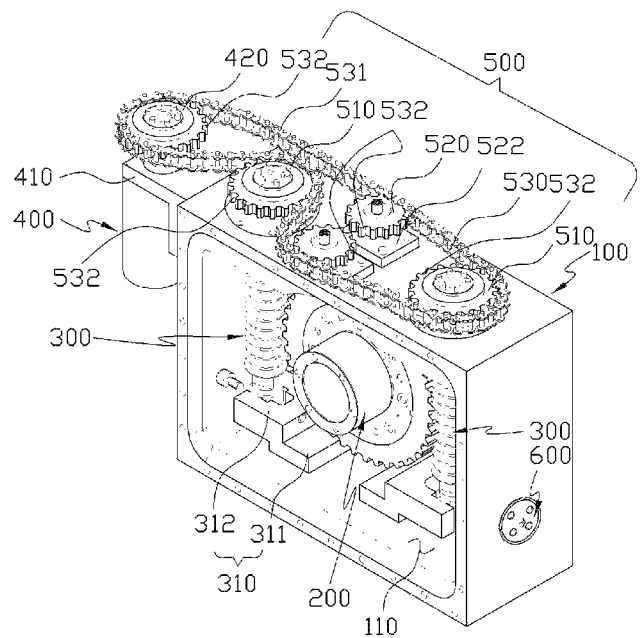
FIG. 6 is a perspective view of a rotary table device having a multi-worm shaft according to a modified embodiment of the present disclosure.

FIG. 1 is a perspective view of a rotary table device having a multi-worm shaft according to an embodiment of the present disclosure, and FIG. 2 is an exploded perspective view of a rotary table device having a multi-worm shaft according to an embodiment of the present disclosure. FIG. 3 is a front view of a rotary table device having a multi-worm shaft according to an embodiment of the present disclosure, and FIG. 4 is a rear view of a rotary table device having a multi-worm shaft according to an embodiment of the present disclosure. FIG. 5 is a perspective view of a rotary table device having a slide portion according to an embodiment of the present disclosure, and FIG. 6 is a perspective view of a rotary table device having a multi-worm shaft according to a modified embodiment of the present disclosure.

Referring to FIGS. 1 to 4, a rotary table device 10 having a multi-worm shaft according to an embodiment of the present disclosure is configured to include a housing 100, a main shaft 200, a pair of worm shafts 300, a driving motor 400, a power transmission member 500, and a clearance adjustment member 600.

The housing 100 is in a rectangular shape, and has a space portion 110 formed therein.

The main shaft 200 is provided in the space portion 110 that is formed inside the housing 100, and a worm wheel 210 having a gear portion formed thereon is coupled along an outer circumference thereof.

On the other hand, on the side of the main shaft 200 to which the worm wheel 210 is coupled, a cover 220 for protecting the main shaft 200 is provided to be coupled to the housing 100.

The pair of worm shafts 300 are provided to be tooth-engaged with the worm wheel 210 at both sides of the worm wheel 210 in the space portion 110 formed inside the housing 100.

One end portion of the pair of worm shafts 300 is coupled to a pair of belt pulleys 510 that are coupled to the upper surface of the housing 100, and the other end portion thereof is coupled to a worm shaft holder 310 that is provided in a predetermined position of a bottom surface of the space portion 110.

Here, the worm shaft holder 310 includes a first horizontal portion 311 that is coupled to the bottom surface of the space portion 110 provided in the housing 100, a second horizontal portion 312 that is formed to extend from one side of an upper portion of the first horizontal portion 311 to an outside, and a cut portion 313 which is formed on the second horizontal portion 312 and to which the other end portion of the worm shaft 300 is inserted and coupled.

The driving motor 400 is provided on one side of the housing 100 and drives the pair of worm shafts 300 through the power transmission member 500 to be described later.

The driving motor 400 is coupled to one side of the housing 100 by a "¬"-shaped fixing bracket 410.

The power transmission member 500 includes a pair of belt pulleys 510 provided on the upper surface of the housing 100, a pair of idle gears 520, and a belt 530, and transmits a driving force of the driving motor 400 to the pair of worm shaft 300.

The power transmission member 500 is configured to include the pair of belt pulleys 510 provided on the upper surface of the housing 100 and coupled to one end portion of the pair of worm shafts 300, the pair of idle gears 520 provided in a predetermined position of the upper surface of the housing so as to be positioned between the pair of belt pulleys 510, and the belt 530 connecting the pair of belt pulleys 510 and the pair of idle gears 520 to the driving shaft 420 of the driving motor 400.

Here, referring to FIG. 5, a plate 522 having a slot hole 521 formed on a center portion thereof may be coupled to the upper surface of the housing 100, and any one of the pair of idle gears 520 may be slidably coupled along the slot hole 521 of the plate 522.

That is, since one of the pair of idle gears 520 slides along the slot hole 521, the tension of the belt 530 that connects the pair of belt pulleys 510 and the driving shaft 420 of the driving motor 400 to each other can be adjusted.

In addition, referring to FIG. 6, the pair of belt pulleys 510 and the pair of idle gears 520 may also be connected to each other through the chain 531 instead of the driving shaft 420 of the driving motor 400 and the belt 530.

In this case, it is preferable that sprockets 532, to which the chain 531 can be connected, are formed on the outer circumference of the driving shaft 420 of the driving motor 400, the pair of idle gears 520, and the pair of belt pulleys 510.

The clearance adjustment member 600 is symmetrically provided in a predetermined position of both sides of the housing 100 to adjust a gap between the worm wheel 210 and the pair of worm shafts 300.

The clearance adjustment member 600 is configured to include a pair of coupling portions 610 symmetrically coupled to predetermined positions of the both sides of the housing 100, and adjustment portions 612 screw-engaged to penetrate centers of the coupling portions 610. The adjustment portions 612 adjust the gap between the worm wheel 210 and the pair of worm shafts 300 through pressing of outer sides of the pair of worm shafts 300.

Hereinafter, the use state of the rotary table device 10 according to an embodiment of the present invention will be described.

First, if the driving motor 400 operates, the driving force of the driving shaft 420 of the driving motor 400 is transmitted to the power transmission member 500 through the driving shaft 420 and the belt 530 to drive the pair of worm shafts 300.

Thereafter, if the pair of worm shafts 300 operate, the main shaft 200 that is tooth-engaged with the pair of worm shafts 300 receives the driving force to be rotated.

In this case, since a set value is adjusted through confirming of the gap between the pair of worm shafts 300 and the tooth-engaged worm wheel 210, the worm shaft holder 310 is adjusted to match the set value, and the gap can be finely adjusted.

Here, in the case of adjusting the worm shaft holder 310, the worm shaft holder 310 that is close to the driving motor 400 is first set, and then the worm shaft holder 310 that is far from the driving motor 400 is adjusted.

As described above, according to the rotary table device 10 according to an embodiment of the present invention, the gap between the worm wheel 210 and the worm shaft 300 can be adjusted so as to prevent the uneven wear which occurs due to the backlash that occurs between the worm 210 and the worm shaft 300.

Although the invention has been described with reference to the preferred embodiments in the attached figures, it is noted that equivalents may be employed and substitutions made herein without departing from the scope of the invention as recited in the claims.

INDUSTRIAL APPLICABILITY

The present invention provides a rotary table device having a multi-worm shaft, and can be used in a rotary table device having a multi-worm shaft that can minimize the backlash that occurs due to wear between the worm wheel and the worm shaft.

What is claimed is:

1. A rotary table device comprising:
a housing having a space portion formed therein;
a main shaft installed in the space portion and provided with a worm wheel coupled along an outer circumference thereof;
a pair of worm shafts provided to be engaged with the worm wheel at both sides of the worm wheel in a predetermined position of the space portion;
a driving motor installed on one side of the housing;
a power transmission member installed on an upper surface of the housing to transmit a driving force of the driving motor to the pair of worm shafts; and
a clearance adjustment member installed in a predetermined position of each lower end of both sides of the housing, wherein the power transmission member comprises:
a pair of belt pulleys provided on the upper surface of the housing and coupled to each end portion of the pair of worm shafts;
a pair of idle gears provided in a predetermined position of the upper surface of the housing so as to be positioned between the pair of belt pulleys; and
a belt connecting the pair of belt pulleys and the pair of idle gears to a driving shaft of the driving motor.

2. The rotary table device as claimed in claim 1, wherein the pair of belt pulleys and the pair of idle gears are connected to each other through the driving shaft of the driving motor and a chain.

3. The rotary table device as claimed in claim 1, wherein at least one of the pair of idle gears is provided on the upper surface of the housing so as to adjust a tension of the belt that connects the driving shaft of the driving motor and the pair of belt pulleys to each other, and is slidably coupled to a plate having a slot formed in a center portion thereof.

4. A rotary table device comprising:
a housing having a space portion formed therein;
a main shaft installed in the space portion and provided with a worm wheel coupled along an outer circumference thereof;
a pair of worm shafts provided to be engaged with the worm wheel at both sides of the worm wheel in a predetermined position of the space portion;
a driving motor installed on one side of the housing;
a power transmission member installed on an upper surface of the housing to transmit a driving force of the driving motor to the pair of worm shafts; and
a clearance adjustment member installed in a predetermined position of each lower end of both sides of the housing, wherein the clearance adjustment member comprises:
a pair of coupling portions symmetrically coupled to predetermined positions of the both sides of the housing; and
adjustment portions screw-engaged to penetrate centers of the coupling portions, wherein the adjustment portions adjust a gap between the worm wheel and the worm shaft through pressing of outer sides of the pair of worm shafts.

\* \* \* \* \*